US006725378B1

(12) United States Patent
Schuba et al.

(10) Patent No.: US 6,725,378 B1
(45) Date of Patent: Apr. 20, 2004

(54) NETWORK PROTECTION FOR DENIAL OF SERVICE ATTACKS

(75) Inventors: Christoph L. Schuba, Mountain View, CA (US); Ivan V. Krsul, LaPaz (BO); Diego Zamboni, West Lafayette, IN (US); Eugene H. Spafford, West Lafayette, IN (US); Aurobindo M. Sundaram, Austin, TX (US); Markus G. Kuhn, Uttenreuth (DE)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 09/293,479

(22) Filed: Apr. 15, 1999

Related U.S. Application Data
(60) Provisional application No. 60/081,829, filed on Apr. 15, 1998.

(51) Int. Cl.[7] ............................ H04L 9/22; G06F 13/36
(52) U.S. Cl. ................... 713/201; 713/201; 709/206; 709/223; 709/224; 707/10
(58) Field of Search .................. 713/201; 709/206, 709/223, 224; 707/10

(56) References Cited

U.S. PATENT DOCUMENTS

| | | | |
|---|---|---|---|
| 5,481,611 A | 1/1996 | Owens et al. ............... 380/25 |
| 5,511,122 A | 4/1996 | Atkinson ..................... 380/25 |
| 5,604,803 A | 2/1997 | Aziz ........................... 380/25 |
| 5,606,668 A | 2/1997 | Shwed .................. 395/200.11 |
| 5,699,513 A * | 12/1997 | Feigen et al. |
| 5,724,425 A | 3/1998 | Chang et al. ............... 380/25 |
| 5,751,812 A | 5/1998 | Anderson ................... 380/48 |
| 5,822,434 A | 10/1998 | Caronni et al. ............. 380/49 |
| 5,826,014 A | 10/1998 | Coley et al. ........... 395/187.01 |
| 5,828,846 A * | 10/1998 | Kirby et al. |
| 5,842,040 A | 11/1998 | Hughes et al. ............. 395/831 |
| 5,845,068 A | 12/1998 | Winiger ..................... 395/186 |
| 5,850,449 A | 12/1998 | McManis .................... 380/25 |
| 5,884,025 A | 3/1999 | Baehr et al. ........... 395/187.01 |
| 5,991,881 A * | 11/1999 | Conklin et al. ............. 713/201 |
| 5,999,932 A * | 12/1999 | Paul ............................ 707/10 |
| 6,061,798 A * | 5/2000 | Coley et al. ................ 713/201 |
| 6,070,242 A * | 5/2000 | Wong et al. ................ 713/201 |
| 6,304,975 B1 * | 10/2001 | Shipley ...................... 713/201 |
| 6,453,345 B2 * | 9/2002 | Trcka et al. .................. 709/24 |

OTHER PUBLICATIONS

RFC 793, Transmission Control, Protocol, iInformation Sciences Institute, University of Southern Califiornia, USA, 1981.*
*Firewalls fend off invasions from the Net*, Steven W. Lodin and Christoph L. Schuba; IEEE Spectrum, Feb. 1998, pp. 26–34.
*Defining Strategies to Protect Against TCP SYN Denial of Service Attacks*, Security Advisory, Cisco Systems, Inc., 1996.
*Advisory CA–96.21; TCP SYN Flooding and IP Spoofing Attacks*, CERT Advisory, Sep. 19, 1996.
*SUN Microsystems Security Bulletin #00136*; Oct. 9, 1996.
*Check Point Firewall–1 White Paper*, Check Point Software Technologies, Ltd., Version 3.0 –Jun. 1997.

* cited by examiner

*Primary Examiner*—Ayaz Sheikh
*Assistant Examiner*—Taghi T. Arani
(74) *Attorney, Agent, or Firm*—Baniak Pime & Gannon

(57) ABSTRACT

An active monitor detects and classifies messages transmitted on a network. In one form, the monitor includes a routine for classifying TCP packet source addresses as being of an acceptable, unacceptable, or suspect type. Suspect source addresses may be further processed in accordance with a state machine having a number of conditionally linked states including a good address state, a new address state, and a bad address state. For this form, the monitor selectively sends signals to targeted destination hosts for addresses in the unacceptable

4 Claims, 5 Drawing Sheets

NETWORK PROTECTION FOR DENIAL OF SERVICE ATTACKS

CROSS-REFERENCE TO RELATED APPLICATIONS

The present application claims the benefit of U.S. Provisional Patent Application Ser. No. 60/081,829 filed Apr. 15, 1998 that is hereby incorporated by reference in its entirety herein.

BACKGROUND OF THE INVENTION

The present invention relates to computer network security, and more particularly, but not exclusively, relates to protection from denial of service attacks caused by initiating, but not completing a number of spurious connections through the Internet.

Concomitant with the development of computer networks, schemes to degrade or defeat operation of such networks have been devised. In response, a host of techniques have been proposed to improve network security. U.S. Pat. No. 5,884,025 to Baehr et al.; U.S. Pat. No. 5,842,040 to Hughes et al.; U.S. Pat. No. 5,826,014 to Coley et al.; U.S. Pat. No. 5,822,434 to Caronni et al.; U.S. Pat. No. 5,604,803 to Aziz; U.S. Pat. No. 5,511,122 to Atkinson; and U.S. Pat. No. 5,481,611 to Owens et al. are cited as sources of additional background information regarding various attempts to improve network security.

One particular type of attack monopolizes available network resources in such a manner that legitimate users are denied service. This type of "denial of service attack" has been recognized in various contexts. One especially troublesome denial of service attack for Internet Protocol (IP) based networks is called "SYN flooding." SYN flooding arises when an attacker sends many Transmission Control Protocol (TCP) connection requests, each initiated with a "SYNchronize" (also called SYN) packet, to a victim's machine. Each request causes the targeted host to instantiate data structures out of a limited pool of resources; however, because the source address for each of these SYN packets is illegitimate or "spoofed," completion of a proper connection is impossible. Consequently, the limited resources of the targeted host are quickly used up in response to the spurious SYN packets so that no more incoming TCP connections can be established—thus denying further legitimate access. The SYN flooding attack exploits weaknesses with TCP/IP (Transmission Control Protocol/Internet Protocol) that cannot be corrected without significant protocol modifications. Moreover, this type of denial of service attack can be launched with little effort, and is difficult to trace back to its originator.

As a result, there is a need for protective techniques that reduce, if not eliminate, the impact of denial of service attacks, such as SYN flooding.

SUMMARY OF THE INVENTIONS

One form of the present invention includes a unique computer network monitoring technique. A further form of the present invention includes a unique defense for denial of service attacks.

In another form of the present invention, network messages passing to one or more hosts from an untrusted network are actively monitored. Suspect messages are identified. The behavior of each suspect message is tracked in terms of a number of conditionally coupled states to determine whether any of the suspect messages present a security threat requiring action.

In yet another form, network messages may be classified into one or more other categories besides the suspect category. By way of nonlimiting example, TCP packets may be categorized as having an unacceptable source address, suspect source address, or acceptable source address.

In an additional form, host resources allocated in response to connection initiation requests from an untrusted network are released by monitoring such requests, determining which requests are unacceptable or suspect, and selectively sending a command that changes the status of such requests from the perspective of the hosts. In one nonlimiting example, host resources dedicated to incomplete TCP connections that are quickly saturated by suspect SYN packets may be released by sending ACKnowledge packets (also called ACK packets) corresponding to the SYN packets. In another nonlimiting example, host resources may be relieved by closing spurious connections through transmission of a ReSeT packet (also called a RST packet).

In still another form, a technique of the present invention includes detecting a number of SYN packets sent from an untrusted network to a destination host to regulate spurious connection attempts. The corresponding source address of each SYN packet is classified in one of a plurality of different categories, the categories including a suspect source address category and an unacceptable source address category. TCP packet behavior is monitored for each address classified in the suspect source address category with a state machine process including at least three different conditionally coupled states, and a RST packet is sent to the destination host for any address classified in the unacceptable source address category.

Accordingly, it is one object of the present invention to provide a unique computer network monitoring technique.

It is another object of the present invention to provide a unique defense for denial of service attacks.

Further objects, forms, features, advantages, aspects, and benefits of the present invention will become apparent from the description and drawings provided herein.

DESCRIPTION OF THE PREFERRED EMBODIMENTS

Figure 1:
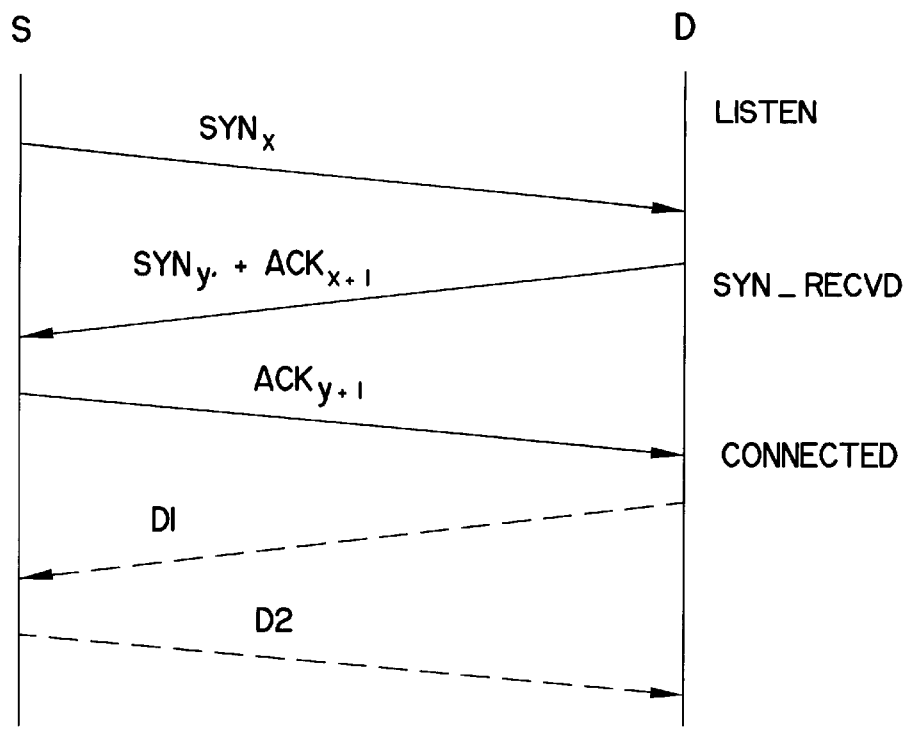
FIG. 1 is a diagram illustrating a Transmission Control Protocol (TCP) three way handshake packet sequence.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The preferred embodiments of the present invention include an active monitor that performs a process to reduce service degradation caused by SYN flooding. In one form, the process includes classifying source addresses of SYN packets as being of an acceptable, unacceptable, or suspect type. Suspect source addresses may be further processed in accordance with a state machine having a number of conditionally linked states. The monitor selectively sends various packets to one or more hosts receiving the SYN packets to reduce or eliminate service denial.

To better explain various aspects of the preferred embodiments, certain features of the Transmission Control Protocol/Internet protocol (TCP/IP) are first described. The Internet Protocol (IP) is the standard network layer protocol of the Internet that provides a connectionless, best effort packet delivery service. IP defines the basic unit of the data transfer used throughout an IP network, called a datagram. The delivery of datagrams is not guaranteed. Datagrams may be lost, duplicated, delayed, or delivered out of order. IP is connectionless, because each packet is treated independently of the others—each may travel over different paths and some may be lost while others are delivered. IP provides best-effort delivery, because packets are not discarded unless resources are exhausted or underlying networks fail. Datagrams are routed towards their destination host. A set of rules characterizes how hosts and gateways should process packets, how and when error messages should be generated, and when packets should be discarded.

To ensure reliable communications for applications and services that need them, the Transmission Control Protocol (TCP) is available. It resides between IP and the application layer. TCP provides a reliable, connection-oriented data stream delivery service. As long as there is link layer communication between two communicating endpoints, TCP guarantees that datagrams will be delivered in order, without errors, and without duplication. It provides these services by using flow control mechanisms, such as the sliding window protocol, and adaptive retransmission techniques.

Referring to FIG. 1, a diagram is provided that illustrates the TCP packet sequence of a three-way handshake needed to establish a TCP connection. Before data can be transmitted between a source host S and a destination host D, TCP needs to establish a connection between source host S and destination host D. The connection establishment process is called the three-way handshake. The three-way handshake is established by exchanging certain TCP packet types between source host S and destination host D. The TCP packet types are distinguished by dedicated flag bits set in a TCP header code field and are listed in Table I as follows:

TABLE I

| TCP Header Flag Bits | Abbreviation |
|---|---|
| SYNchronize | SYN |
| ACKnowledgement | ACK |
| ReSeT | RST |

It should be appreciated that, under appropriate conditions, more than one of the flag bits may be set in the same TCP packet.

The first transmission in the three-way handshake is from source host S to destination host D in the form of a SYN packet (SYN flag bit set) while destination host D is in the LISTEN state. The second message, from destination host D to source host S, has both the SYN and ACK bit flags set (SYN+ACK) indicating that destination host D acknowledges the SYN packet and is continuing the handshake. At this point, destination host D is in the SYN_RECVD state. The third message, from source host S to destination host D has its ACK bit flag set, and is an indication to destination host D that both hosts S and D agree that a connection has been established, resulting in the CONNECTED state of destination host D. The third message may contain user payload data. Datagrams D1 and D2 represent data exchanges that take place after proper establishment of the TCP connection.

The three-way handshake also initializes the sequence numbers for a new connection between source host S and destination host D. The sequence numbers are represented in FIG. 1 by subscripts to the packet abbreviations. Sequence numbers are needed by the TCP protocol to enable reliable packet delivery and retransmission. Source host S sends an initial sequence number x with the first datagram: $SYN_x$. In the second message, destination host D acknowledges the first datagram with $ACK_{x+1}$ and sends its own sequence number y: $SYN_y$. Source host S acknowledges the destination host D's packet in the final message of the three-way handshake with $ACK_{y+1}$.

For any TCP connection, there are memory structures that need to be allocated by both endpoints. For an example under the BSD style of network code, three memory structures need to be allocated at each endpoint. The socket structure (socket) holds information related to the local end of the communication link: protocol used, state information, addressing information, connection queues, buggers and flags. TCP uses the Internet protocol control block structure (inpcb) at the transport layer to hold information such as TCP state information, IP address information, port numbers, IP header prototype and options, and a pointer to a routing table entry for the destination address. The TCP control block structure (tcpcb) contains TCP specific information such as timer information, sequence number information, flow control status, and out-of-band data. The combined size of these data structures for a single TCP connection may typically exceed 280 bytes. Although the data structures and allocation schemes used to accommodate TCP connection formation differ with various types of operating systems, generally every TCP connection establishment requires an allocation of significant memory resources.

When a SYN packet arrives at a port on which a TCP server is listening, the above-mentioned data structures are allocated. There is a limit on the number of concurrent TCP connections that can be in a half-open connection state, called the SYN–RECVD state (i.e., SYN received). When the maximum number of half-open connections per port is reached, TCP discards all new incoming connection requests until it has either cleared or completed some of the half-open connections. Typically, several ports can be flooded in this manner, resulting in degraded service or worse. Moreover, it should be appreciated that without a limit on the number of half-open connections, a different denial of service attack would result in which an attacker could request so many connections that the target machine's memory is completely exhausted by allocating data structures for half-open TCP connections. Table II illustrates the half-open connection states that may be accommodated by various operating systems as follows:

TABLE II

| Operating System | Backlog | Backlog + Grace |
|---|---|---|
| FreeBSD 2.1.5 | n.a. | 128 |
| Linux 1.2.x | 10 | 10 |
| Solaris 2.4 | 5 | n.a |
| Solaris 2.5.1 | 32 | n.a. |
| SunOS 4.x | 5 | 8 |
| Windows NTs 3.51 | 6 | 6 |
| Windows NTw 4.0 | 6 | 6 |

With reference to FIG. 1, detailed below is one typical example of what happens from the point of view of destination host D (alternatively designated as "server"):

1. A packet arrives at the destination machine when the TCP state machine is in the LISTEN state.
2. If the datagram checksum is incorrect, the packet will be discarded, and the client is expected to retransmit it.
3. The tcpcb associated with the connection is searched for. If it is not found, the server will discard the packet and will send a RST (i.e., inform the client that it reset the connection). If the tcpcb exists, but the TCP state machine is not in the LISTEN state, the server will discard the packet, but will not send a RST (this would, for example, be the case when the server is just coming up, but has not yet started listening).
4. If the SYN packet arrives for a socket that is in the LISTEN state, the above mentioned data structures will be allocated. However, the server will also set a flag indicating that it will destroy the connection and associated memory structures if it encounters an error. If the backlog queue is full, the server will consider this an error and will terminate the connection.
5. The packet will be ignored if it contains a RST. If it contains an ACK, it will be discarded and a RST sent to the other side. The packet will be discarded if the SYN bit is not set. Otherwise, the server copies information, such as the client's address information, into a buffer, connects its tcpcb to the client, and initializes its initial send sequence (ISS) number y.
6. The server now sends the second message of the three-way handshake ($SYN_{x+1}$ and $ACK_y$) to the client. The state changes to SYN–RECVD. A connection establishment timer is started for this half-open connection. The connection remains in the SYN–RECVD state until either an ACK (the third message of the handshake) is received, resulting in the CONNECTED state, or a timer expires. This timer is usually set to about 75 seconds. During this period of time retransmissions of the first and second message of the three-way handshake may occur. When the timer expires, all memory structures associated with the connection are deallocated, and the server goes back to the LISTEN state.

Figure 2:
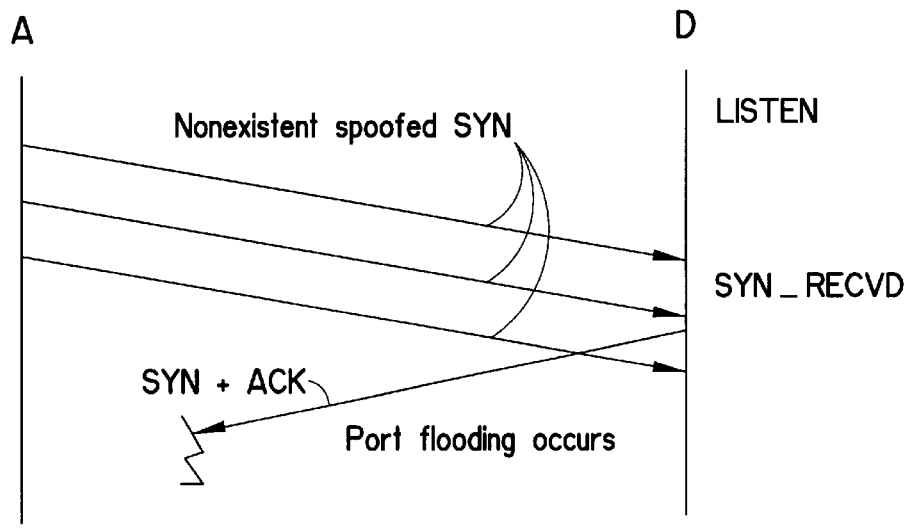
FIG. 2 is a diagram illustrating a SYN flood packet sequence.

As previously described, TCP implementations are designed with a small limit on how many half-open connections per port are possible at any given time. With reference to FIG. 2, a SYN flood attack by attacker A is next described. Attacker A initiates a SYN flooding attack by sending many connection requests with spoofed source addresses to the victim machine, destination host D. In response, destination host D allocates resources to each half-opened connection. Once the limit of half-open connections is reached, destination host D refuses all successive connection establishment attempts—including any legitimate attempts. This condition exists until either the timer expires, or some connections are completed or reset. If the timer expires for a particular half-open connection, the host will reset the connection and release all the resources allocated for it. It should be appreciated that neither outgoing connection attempts nor connections that are already established are affected by this type of attack.

If a spoofed SYN packet contains the source address of a reachable IP source host S, that host will receive the second message of the three-way handshake generated by destination host D. Not expecting the SYN+ACK without having requested a connection, the source host S will send a RST packet to destination host D, and consequently cause destination host D to reset the connection. It is therefore in the interest of attacker A to forge source addresses that do not belong to hosts that are reachable from the victim destination host D.

If attacker A wants the denial of service condition to last longer than the timeout period, he needs to continuously keep requesting new connections from the victim destination host D. The amount of CPU and network bandwidth required by attacker A for a sustained attack is negligible.

Typical SYN flooding attacks can vary several parameters: the number of SYN packets per source address sent in a batch (=: batch size), the delay between successive batches (=: delay), and the mode of source address allocation (=: mode). For the purposes of SYN flooding, "spoofed" source addresses of the corresponding SYN packets generally include source addresses of source hosts S that are not reachable from destination host D, because the addresses are not yet allocated, assigned, or associated with source hosts S that are very slow in response, virtually or physically disconnected, or down. Possible modes of source address allocation include: a single address, a short list of addresses, or no list at all.

The single address approach takes as a parameter a single spoofed address that is used as the source address of all SYN packets. In the absence of any defense, this mode of attack is as effective as the other three modes described. For the short list mode, attacker A can generate a small pool of addresses and use them as source addresses to generate SYN packets. In the no list mode, attacker A can use a different, randomly generated source address for each successive batch of SYN packets.

Figure 3:
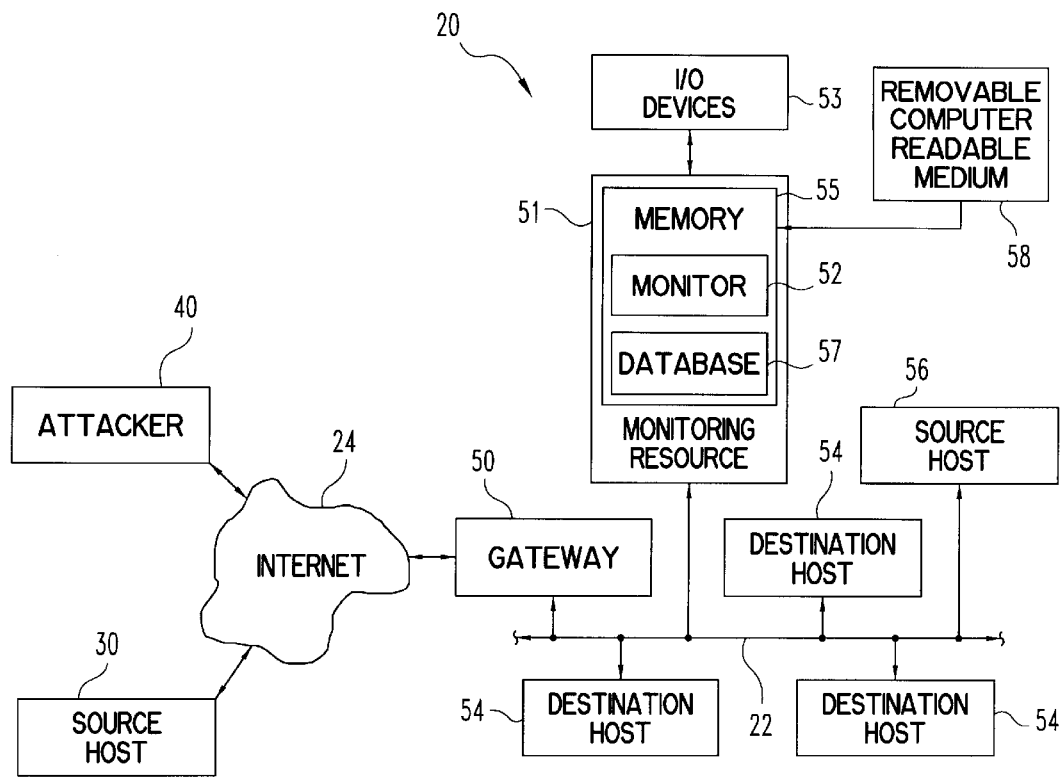
FIG. 3 is a schematic view of a network system.

Referring to FIG. 3, network system 20 of one embodiment of the present invention is illustrated. System 20 includes a trusted, local area network 22 operatively coupled to an untrusted network 24, such as the internet, by gateway 50. Untrusted network 24 includes an attacker 40 and an external source host 30. In practice, many more hosts would be present on network 24, but are not shown to preserve clarity.

In addition to gateway 50, monitoring resource 51 is also operatively coupled to network 22. A monitoring program, monitor 52, is configured for execution by monitoring resource 51 to protect other resources on network 22 from SYN flooding by sources from untrusted network 24, such as from attacker 40, and still facilitate establishment of connections with legitimate external sources, such as source host 30. Among the resources protected by monitor 52 are a number of destination hosts 54.

Destination hosts 54 are each operatively coupled to network 22. While only three destination hosts 54 are shown in FIG. 3, in practice many more destinations may be coupled to network 22 and correspondingly protected by monitor 52. Also operatively coupled to network 22 is local source host 56. In practice, many more source hosts may also be present on network 22, but are not illustrated to preserve clarity. Furthermore, with regard to network 22 and network 24, it should be understood that designations of a host as a source or destination type are for clarity of explanation, and that in practice equipment coupled to network 22 may typically operate as both a source and destination relative to another host. In one nonlimiting example, network 22 is Ethernet based.

It is preferred that monitoring resource 51 be in the form of a programmable digital computer that is operable to execute monitor 52. Monitoring resource 51 may be in the form of a single processing unit operatively coupled to network 22 or a distributed system of different units operatively coupled to network 22, as would occur to those skilled in the art. Resource 51 includes various hardware elements such as one or more Input/Output (I/O) devices 53 and memory 55. It is preferred I/O devices 53 include at least one means of administrative input to facilitate selective communication and control of monitor 52. I/O devices 53 may include a keyboard, mouse, visual display, and/or printer to name only a few possibilities.

Programming for resource 51, including monitor 52, is encoded on a computer readable medium, such as memory 55. Memory 55 may be of the random access, solid-state type, the optical type (such as a Compact Disk type), the electromagnetic type (such as a floppy or hard disk), or another type as would occur to those skilled in the art. Furthermore, memory 55 may be a combination of one or more of these types. As schematically shown in FIG. 3, at least a portion of memory 55 may be in the form of a removable computer readable medium 58, such as a disk or cartridge.

Also schematically represented in FIG. 3 is database 57 stored in memory 55. Database 57 may be accessed by monitor 52 and is preferably initially installed, updated, and maintained by administrative input via I/O devices 53.

Monitor 52 is preferably arranged to capture IP/TCP datagrams passing along network 22 regardless of source or destination, including any TCP packets involved in a three-way handshake with destinations 54. Preferably, monitor 52 does not block or interfere with the transmission of packets to destination hosts 54, but rather examines the packets and reacts by selectively generating packets for one or more of destination hosts 54. Further, when a destination host 54 responds with a packet, such as a SYN+ACK packet, monitor 52 permits it to proceed. Monitor 52 is also arranged to asynchronously time selected events and respond to administrative inputs.

Figure 4:
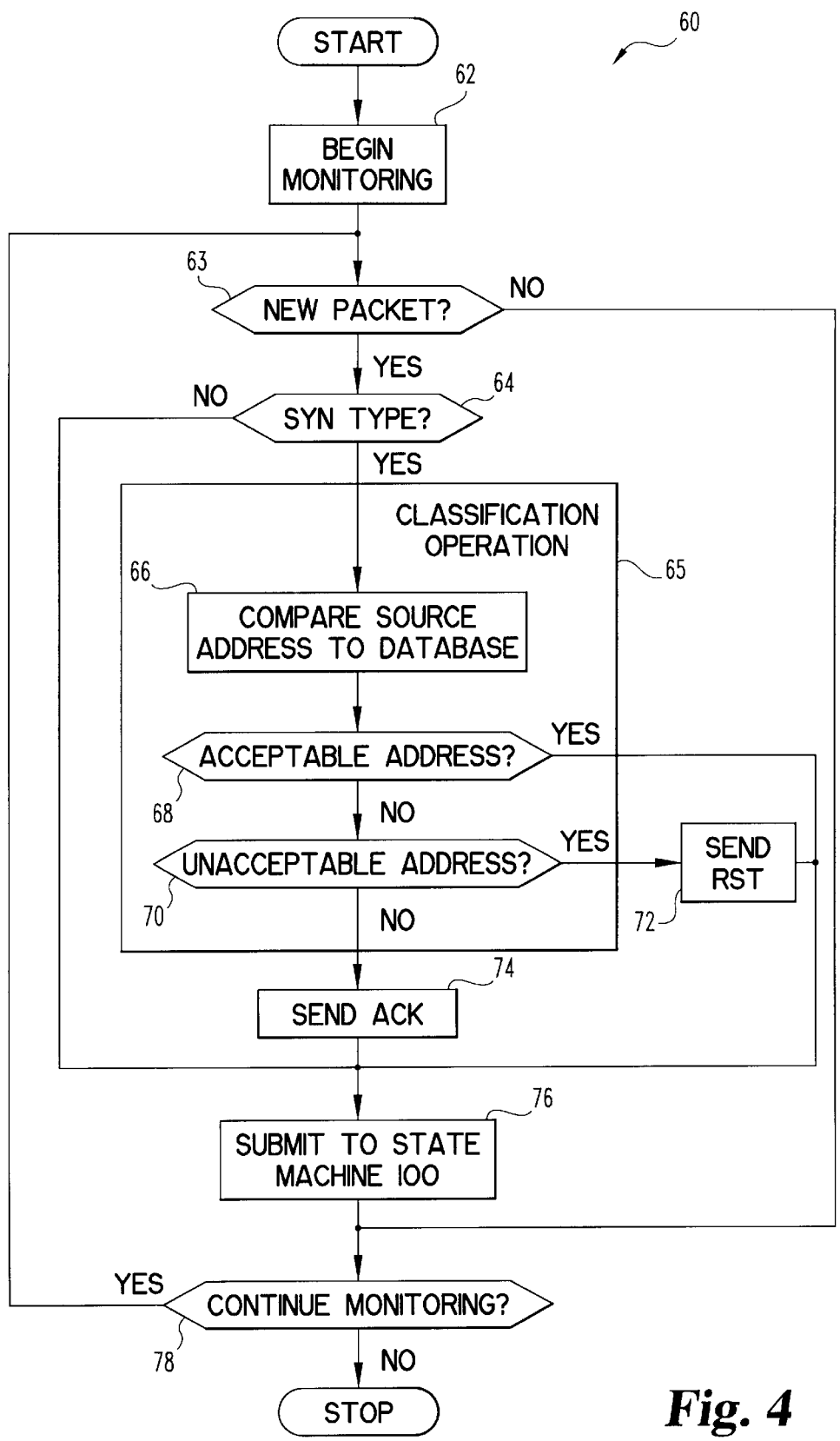
FIG. 4 is a flow chart illustrating a routine performed by the system of FIG. 3.

FIG. 4 is a flow chart illustrating routine 60 of monitor 52. Routine 60 begins with stage 62. Stage 62 initiates the detection and examination of TCP packets sent to destination hosts 54 along network 22. After stage 62, conditional 63 is encountered. Conditional 63 tests whether a new TCP packet has been sent to one of destination hosts 54 along network 22. If a new TCP packet is not detected, then conditional 78 is encountered to determine whether monitoring is to continue. Generally, monitoring continues absent an administrative input to the contrary via I/O devices 53. If monitoring is to continue, control loops back to conditional 63 to continue packet detection. If monitoring is not continued, routine 60 halts.

When conditional 63 results in the detection of a TCP packet, conditional 64 is next encountered. Conditional 64 tests whether the newly detected packet is of the SYN variety. If the detected TCP packet is not of the SYN variety, the new packet is submitted to state machine 100 in stage 76.

Figure 7:
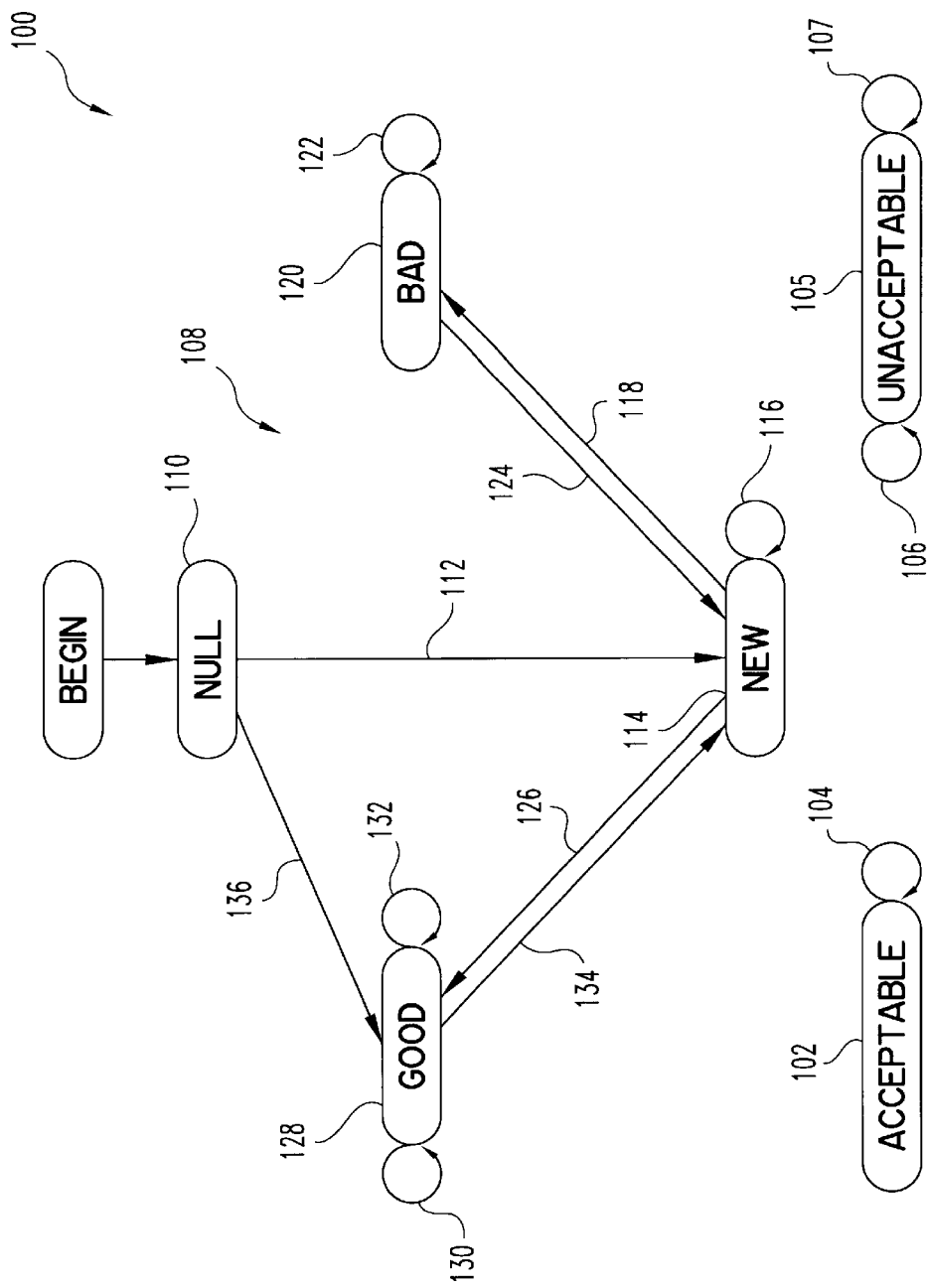
FIG. 7 is a diagram illustrating a state machine process operated as part of the routine of FIG. 4.

The operation of state machine 100 is described in detail in connection with FIG. 7 hereinafter.

If the newly detected TCP packet is of the SYN variety, then source address classification operation 65 is initiated. Operation 65 begins with accessing database 57 of monitor 52 at stage 66. After accessing database 57, operation 65 continues with conditional 68. At conditional 68, the source address of the newly detected TCP packet is compared to a set of entries in database 57 representative of acceptable addresses. If the source address of the newly detected packet is one of the acceptable addresses, classification operation 65 is exited and the acceptable source address is submitted to state machine 100 in stage 76 for continued monitoring. Correspondingly, routine 60 takes no further action for any packet having a source address classified as acceptable or "perfect," and presumes the three way handshake illustrated in FIG. 1 will be completed in the usual manner.

Figure 5:
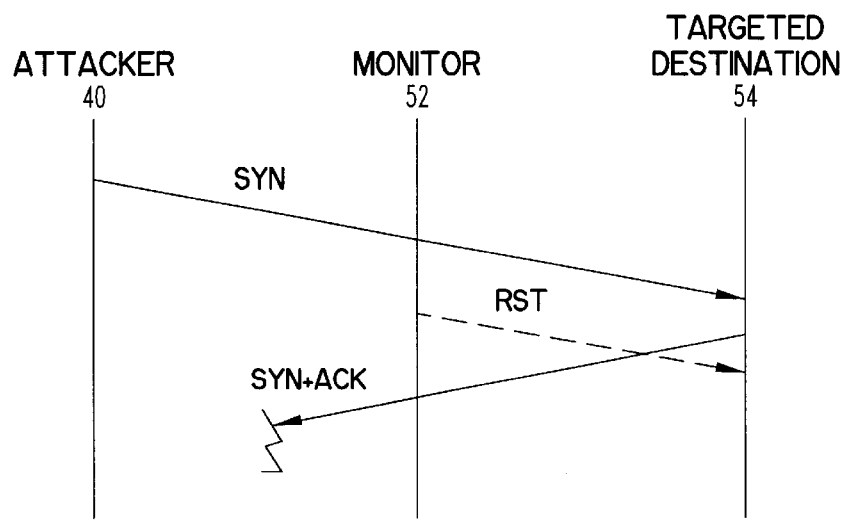
FIG. 5 is a diagram of a first packet sequence illustrative of certain aspects of the routine of FIG. 4.

If, on the other hand, the source address of a newly detected SYN packet is not one of the acceptable addresses, control flows to conditional 70 to test whether the newly detected SYN packet has a source address that is unacceptable or "evil" as represented by one of another set of entries in database 57. If so, classification operation 65 of routine 60 is exited and a RST packet is sent in stage 72 to the targeted destination host 54 that receives the SYN packet with an unacceptable address to close the corresponding TCP connection. By closing the connection, the RST packet frees resources of the targeted destination host 54. FIG. 5 is a diagram illustrating the packet sequence observed for processing through state 72 for a SYN packet with an unacceptable source address. Any subsequent RST packets are ignored with regard to the FIG. 5 packet sequence. From stage 72, routine 60 continues to stage 76.

The two sets of entries in database 57 corresponding to acceptable and unacceptable addresses, respectively, are preferably input via one or more I/O devices 53. These addresses may be updated as needs require. Preferably, the acceptable addresses include addresses of well-known, frequently used source hosts, such as local source host 56, and the unacceptable addresses include as a minimum those addresses (or address ranges) that are reserved, impossible (such as net 0.0.0.0 or 127.0.0.0), or confirmed spoof addresses (such as nets 10.0.0.0, 172.16.0.0, and 192.168.0.0).

Figure 6:
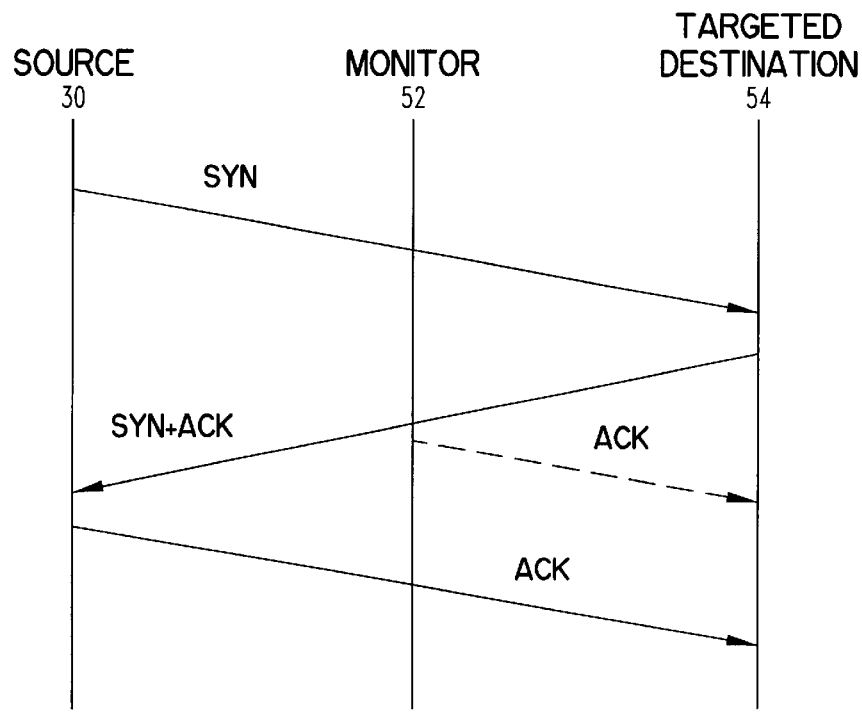
FIG. 6 is a diagram of a second packet sequence illustrative of certain aspects of the routine of FIG. 4.

Source addresses of SYN packets that are neither of the acceptable or unacceptable type, as determined by accessing database 57, are designated "suspect" addresses. For a suspect address, an ACK packet is sent to the targeted host destination 54 that has received the detected SYN packet. This ACK packet is arranged to appear as though is originates from the same source address as the detected SYN packet. Sending the ACK packet completes the three way handshake, moving the TCP connection from a half-open status (SYN–RECVD) to a completed status (CONNECTED). Changing a connection from half-open status to completed status removes it from the limited backlog queue of the targeted destination host 54 receiving the ACK packet, freeing it to establish another half-TCP connections. The diagram of FIG. 6 illustrates the sequence of packets corresponding to processing through stage 74 for a newly detected SYN packet with a suspect address. As shown in FIG. 6, if an ACK packet is later received by the targeted destination host 54 from a legitimate host, such as source host 30, it is simply ignored.

After stage 74, the suspect address is submitted to state machine 100 in stage 76. Referring to FIG. 7, state machine 100 is shown in greater detail. State machine 100 is a process of monitor 52 that further evaluates and reacts to selected TCP packets in accordance with source address classification by operation 65.

Referring to state machine 100, any detected TCP packet that has an acceptable source address is placed in acceptable address state 102. State 102 is not conditionally coupled to any other states of state machine 100—in other words, source addresses classified in state 102 remain in state 102. Condition loop 104 of state 102 is triggered when either an ACK packet, a RST packet, or a SYN packet with the acceptable address is detected with monitor 52 via routine 60. In response, the corresponding source address remains in state 102. Accordingly, state 102 signifies that monitoring routine 60 does not interfere with the usual handling of TCP packets with an acceptable source address.

Any detected TCP packet that has an unacceptable source address is placed in unacceptable address state 105. State 105 is not conditionally coupled to any other states of state machine 100—in other words, source addresses classified in state 105 remain in state 105. Conditional loop 106 is triggered whenever an ACK packet or a RST packet is detected that has an unacceptable address. In response, the corresponding source address remains in state 105. Conditional loop 107 is triggered whenever a SYN packet with an unacceptable address is detected. SYN packet detection causes the transmission of an appropriately configured RST packet to close the connection in stage 72 as described in connection with FIG. 4. Like loop 106, there is no change of state caused by loop 107. Accordingly, any attempts to request a connection with one of destinations 54 that has an unacceptable address result in closing the connection to release destination host 54 resources.

Generally, states 102 and 105 are symbolic of the manner in which each of two categories of addresses are treated after classification by operation 65, and do not involve any appreciable amount of processing beyond the stages shown in FIG. 4. The third category, suspect addresses, are further classified and processed in accordance with the conditionally coupled states 108 of state machine 100. States 108 are initially engaged at null address state 110. All source addresses that are not in state 102 or 105, that is not included in database 57, are initially considered to be in null address state 110. Unlike acceptable and unacceptable addresses, a database entry for every suspect addresses is preferably not kept to conserve storage resources.

From the null address state 110, transition path 112 is followed if a SYN packet for the suspect source address in the null state is detected and submitted to state machine 100 from routine 60. In response, the source address is placed in new address state 114 and a record of the corresponding datagram is established, including information such as IP addresses, ports, and sequence numbers. This information is saved in case a RST packet needs to be sent to the corresponding source address in response to a later condition. A timestamp for the given source address is also established when the transition from null address state 110 to new address state 114 occurs. This timestamp is used in connection with certain timer events described in connection with other states 108. New address state 114 corresponds to suspect source addresses for which there is too little information to determine if a connection with a destination host 54 should be allowed.

New address state 114 is coupled to conditional loop 116. Loop 116 is triggered by the receipt of further SYN packets, symbolizing that new address state 114 is maintained in response to multiple SYN packets. In response to the triggering of loop 116, current datagram information is recorded for use in case a RST packet needs to be sent to a corresponding destination host 54 in a different state. Transition path 118 conditionally couples new address state 114 and bad address state 120. If a given source address remains in state 114 for a time period T1 determined by monitor 52 relative to its timestamp, an "expiry" timer event is generated. A change of state from new address state 114 to bad address state 120 along transition path 118 is triggered by an expiry event.

Figure 8:
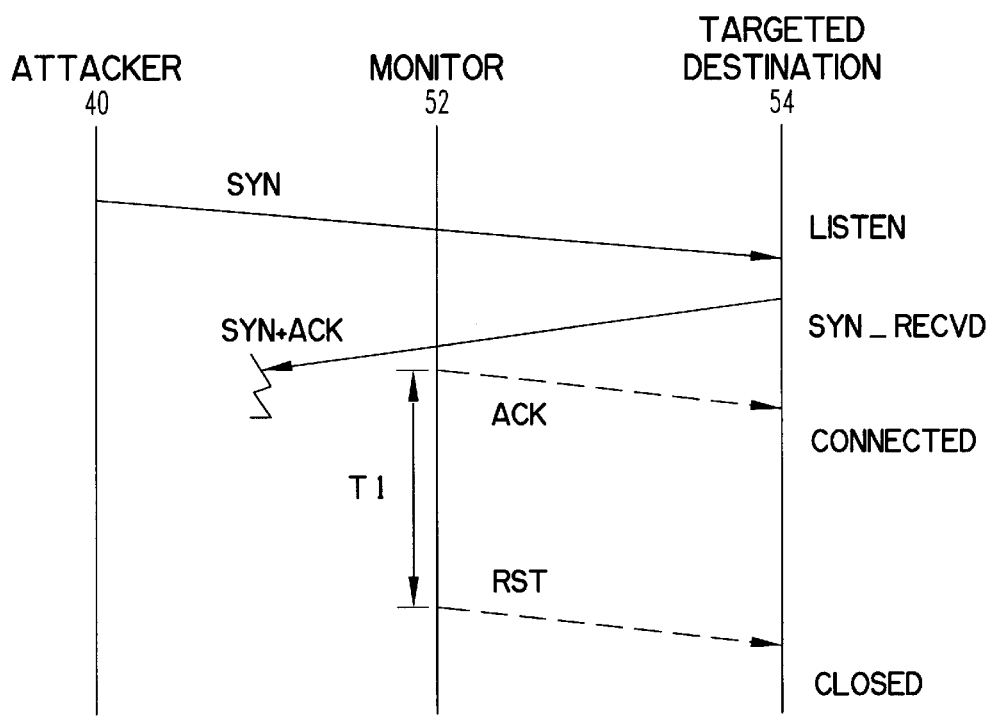
FIG. 8 is a diagram of a third packet sequence illustrative of certain aspects of the routine of FIG. 4 and the state machine process of FIG. 7.

Conditional loop 122 is triggered by the detection of any successive SYN packets with the suspect source address in bad address state 120. The triggering of conditional loop 122 causes a RST packet to be sent to the targeted destination host 54 in the manner described in connection with stage 72. Accordingly, the connection associated with the source address in state 120 is closed, freeing resources of the targeted destination host 54. Conditional loop 122 returns to bad address state 120 with each successive SYN packet corresponding to the suspect source address. As a result, suspect addresses that are likely to be spoofed reach bad address state 120 after first being monitored at the new address state 114 for the time period T1. The diagram of FIG. 8 illustrates the packet sequence for a suspect source address in bad address state 120 for which a RST packet is transmitted to the targeted destination host by triggering conditional loop 122 with another SYN packet. Preferably, time period T1 is set to a value significantly less than the default time-out duration commonly associated with the targeted destination host 54. However, it should be appreciated that a time period T1 that is too low may adversely impact the formation of relatively slow legitimate connections.

On the other hand, the detection of a ACK packet or a RST packet for the suspect address in the bad address state 120 triggers a change of state along transition path 124 to new address state 114. This change of state also causes the timestamp associated with the suspect source address undergoing the transition to be updated for timing another potential expiry timer event.

Besides bad address state 120, new address state 114 is also conditionally coupled to good address state 128. The good address state corresponds to suspect source addresses that are most likely legitimate. For a suspect address placed in the new address state 114, a change of state to good address state 128 via transition path 126 is triggered by detection of an ACK packet or RST packet with that suspect source address. This change of state also results in the updating of the timestamp associated with the suspect source address.

Once in the good address state 128, subsequent ACK or RST packets trigger conditional loop 130 which does not cause further changes of state. Subsequent SYN packets trigger conditional loop 132 that also does not cause a change of state. However, unlike conditional loop 130, conditional loop 132 updates the timestamp for the corresponding suspect source address in the good address state.

If a suspect source address remains in the good address state 128 for a predetermined time period T2 without any TCP packet traffic having this address, a "staleness" timer event is generated that triggers a change of state from good address state 128 to new address state 114 along transition path 134. Also, this event results in a fresh datagram information record and timestamp updating to prepare for the possibility of a later transition to bad address state 120 in response to generation of an expiry timer event while in new address state 114. Thus in accordance with state machine 100, a given suspect address that was once "good" can become "bad" in response to suspect TCP packet behavior.

Further, it should also be appreciated that the transition of a suspect address from null address state 110 to good address state 128 may occur directly when an associated ACK packet or a RST packet is detected, indicating a legitimate connection. This change of state is represented by transition path 136 and is also accompanied by timestamp updating. The operation of state machine 100 is arranged to halt in accordance with conditional 78 of routine 60.

It should be appreciated that routine 60 classifies source addresses into one of a number of categories. Classification operation 65 classifies the source IP addresses of TCP packets in one of three categories: (1) acceptable, (2) unacceptable, or (3) suspect. State machine 100 further classifies suspect addresses as: (1) never seen (=: null); (2) correctly behaving (=: good) hosts; (3) potentially spoofed (=: new), or (4) as most certainly spoofed (=: bad).

In accordance with these classifications, monitor 52 sends a RST packet to unacceptable or bad addresses, closing corresponding connections to free resources of destination hosts 54. Further, an ACK packet is sent for suspect source addresses to free resources of the destination hosts 54 by removing connections from a half-open backlog queue. Further, states 108 of state machine 100, conditionally coupled by transition paths 112, 118, 124, 126, 134, and 136, permit suspect address classification to change based on observed behavior of network traffic and asynchronous events, such as expiry and staleness event timers.

In other embodiments of the present invention, an ACK packet transmission in stage 74 may not be performed or may only be selectively performed for suspect addresses. Additionally or alternatively, in one further embodiment the acceptable address classification is not performed. In still another embodiment, all addresses are considered suspect and correspondingly submitted to a state machine process rather than each being initially classified into one of a plurality of different categories by operation 65. Furthermore, it is envisioned that other embodiments of the present invention may be applied to improve security of networks having a protocol other than TCP/IP.

Yet another embodiment of the present invention includes timing the frequency of unacceptable and/or bad source address SYN packets and using a conventional statistical model to predict arrival of the next spoofed SYN packet. A RST may be sent for any packets arriving in the spoofed time interval to enhance protection of destination hosts 54. In still another embodiment suited to SYN flooding based on pseudorandom number generated addresses, routines may be implemented that detect use of pseudorandom sequences generated by various conventional generators to identify spoofed SYN packets. In other embodiments, as trusted address ranges are identified, they may be incorporated into the acceptable address testing of classification operation 65. An additional embodiment of the present invention includes gathering statistics concerning good and bad address states to selectively add the corresponding good or bad source addresses as acceptable or unacceptable address entries in database 57, respectively.

Another embodiment of the present invention includes a monitoring resource responsive to TCP connection packets to detect a source address for each and determine if the source address is of a suspect type. The monitoring resource is operable to permit one or more hosts to receive the TCP connection packets and is programmed with a state machine having a number of conditionally coupled states to process an address of the suspect type. The states include a new address state, a good address state, and a bad address state.

An additional embodiment of the present invention includes a computer readable medium encoded with a monitoring program to reduce performance degradation of a network caused by a denial of service attack with SYN flooding. The program is operable to detect each of a plurality of SYN packets sent on the network to one or more hosts and classify a source address for each of the SYN packets in one of a plurality of categories. A first one of the categories corresponds to a suspect source address and a second one of the categories corresponds to an unacceptable source address. The program defines a state machine process to monitor any address in the first one of the categories in accordance with at least three conditionally coupled states. The program is operable to send a corresponding RST packet to any of the one or more hosts receiving a SYN packet with an address classified in the second one of the categories.

Other embodiments include monitoring TCP connection status from an untrusted network to a number of destinations operatively coupled to the untrusted network to reduce a performance degradation caused by SYN packet flooding from the untrusted network. A TCP connection source address is classified in a good address state when an ACK packet or a RST packet is received from the untrusted network with the source address. The source address is reclassified from the good address state to a new address state after a first predetermined time period passes without receiving the ACK packet or the RST packet from the untrusted network. Furthermore, the source address is reclassified from the new address state to a bad address state after a second predetermined time period passes without receiving the ACK packet or the RST packet from the untrusted network. A RST packet is sent to a corresponding one of the destinations to close a respective connection for a source address in the bad address state.

All publications, patents, and patent applications cited in this specification are herein incorporated by reference as if each individual publications, patent, or patent application were specifically and individually indicated to be incorporated by reference and set forth in its entirety herein. While the invention has been illustrated and described in detail in the figures and foregoing description, the same is to be considered as illustrative and not restrictive in character, it being understood that only the preferred embodiment has been shown and described and that all changes, equivalents, and modifications that come within the spirit of the invention as defined by the following claims are desired to be protected.

What is claimed is:

1. A method, comprising:

monitoring TCP connection status from an untrusted network to a number of destination hosts operatively coupled to the untrusted network to reduce a performance degradation caused by SYN flooding from the untrusted network;

classifying a TCP connection source address in a good address state when an ACK packet or a RST packet is received from the untrusted network with the source address;

reclassifying the source address from the good address state to a new address state after a first predetermined time period passes without receiving the ACK packet or the RST packet from the untrusted network;

reclassifying the source address from the new address state to a bad address state after a second predetermined time period passes without receiving the ACK packet or the RST packet from the untrusted network; and sending a RST packet to a corresponding one of the destination hosts to close a respective connection after the source address is classified in the bad address state.

2. A method, comprising:

monitoring a number of SYN packets sent from an untrusted network to a destination host to regulate spurious TCP connection attempts, the number of SYN packets each having a corresponding source address;

classifying the corresponding source address in one of a plurality of different categories, the different categories including a suspect source address category and an unacceptable source address category, said classifying including comparing the corresponding source address to a number of entries in a database;

sending a ACK packet to the destination host for each of the number of SYN packets having the corresponding source address classified in the suspect source address category to complete formation of a corresponding TCP connection with the destination host;

sending a RST packet to the destination host for the each of the number of SYN packets classified in the unacceptable source address category to close a respective connection with the destination host;

said monitoring including examining each of the corresponding source addresses in the suspect source addresses category in accordance with a state machine including at least three conditionally coupled states; and wherein a one state of the at least three conditionally coupled states corresponds to a good source address, a second state corresponds to a new source address, and a third state corresponds to a bad source address, and the corresponding source address classified in the suspect source address category cannot change from the one state to the third state without first changing to the second state.

3. A method, comprising:

monitoring a number of SYN packets sent from an untrusted network to a destination host to regulate spurious TCP connection attempts, the number of SYN packets each having a corresponding source address;

classifying the corresponding source address in one of a plurality of different categories, the different categories including a suspect source address category and an unacceptable source address category, said classifying including comparing the corresponding source address to a number of entries in a database;

sending a ACK packet to the destination host for each of the number of SYN packets having the corresponding source address classified in the suspect source address category to complete formation of a corresponding TCP connection with the destination host;

sending a RST packet to the destination host for the each of the number of SYN packets classified in the unacceptable source address category to close a respective connection with the destination host;

said monitoring including examining each of the corresponding source addresses in the suspect source address category in accordance with a state machine including at least three conditionally coupled states;

a one state of the at least three conditionally coupled states corresponds to a good source address, a second state corresponds to a new source address, and a third state corresponds to a bad source address, and the corresponding source address classified in the suspect source address category cannot change from the one state to the third state without first changing to the second state; and wherein the RST packet is sent to the destination host for any of the number of SYN packets having suspect sources addresses in the third state.

4. A method, comprising:

monitoring a number of SYN packets sent from an untrusted network to a destination host to regulate spurious TCP connection attempts, the number of SYN packets each having a corresponding source address;

classifying the corresponding source address in one of a plurality of different categories, the different categories including a suspect source address category and an unacceptable source address category, said classifying including comparing the corresponding source address to a number of entries in a database;

sending a ACK packet to the destination host for each of the number of SYN packets having the corresponding source address classified in the suspect source address category to complete formation of a corresponding TCP connection with the destination host;

sending a RST packet to the destination host for the each of the number of SYN packets classified in the unacceptable source address category to close a respective connection with the destination host; and wherein TCP packets designating the designation host are received by the destination host.

* * * * *